Patented Apr. 25, 1939

2,155,923

UNITED STATES PATENT OFFICE 2,155,923

METHOD OF BLEACHING NUT SHELLS

James A. Armstrong, Monrovia, Calif.

No Drawing. Application December 21, 1938,
Serial No. 247,047

10 Claims. (Cl. 99—231)

This invention pertains to the bleaching of nut shells, and pertains particularly to a two-stage bleaching process which is effective to remove all known types of stains from nut shells, to a degree not hitherto obtainable in the art.

This application is a continuation-in-part of my co-pending application, Serial No. 196,676, filed February 15, 1938.

The principal object of the invention is to provide a simple two-stage procedure for bleaching and/or cleaning nut shells, employing two cooperating reagents which act to produce results not obtainable by the use of either reagent alone.

A further object of the invention is to provide a process for bleaching nut shells which is useful in the bleaching of complete nuts, i. e., in the bleaching of shells which enclose the nut meat, without deleterious effect on the nut meat itself, and which, in spite of cracks or open seams in the nut which would permit entry of the bleaching solutions into contact with the nut meat, will cause no damage to the nut meat.

The present invention in applicable to the treatment of substantially all known types of nut shells, such as walnuts, peanuts, pecans, filberts, butternuts, and the like, but for the purpose of simplicity, the following description is substantially confined to the treatment of walnuts in view of the outstanding examples of removal of certain types of walnut stain which are available for purposes of illustration. In general, the quality of the walnut kernel is not indicated by the color of the shell, but it is the general practice in the nut-packing industries to bleach the shells in order to produce a more attractive appearance in view of the preference which buyers exhibit for light-colored nuts. Most walnuts of good commercial quality have shells of a brownish straw color and in some instances the shells will be of a light straw color which is more favored in the trade. The lighter-colored nuts demand a higher price regardless of the comparative quality of the contained nut meats.

Three distinct types of stain are encountered in walnuts, and are for the most part unavoidable. For example, there is one class of nuts termed "pink eye" which are characterized by spots or irregularly shaped discolorations ranging in color from pink to dark brown, some nuts being discolored over their entire surface. The cause of this stain is unknown, and no hitherto proposed bleaching procedure has been found to be effective in the removal of the stain. "Pink eye" nuts are classified as culls or "second grade", because of their poor external appearance, although the actual quality of the meat may be very high. A second type of stain is that such as is caused by the "Walnut Husk-Fly" [*Rhadoletis completa* (Cresson)], an insect which passes a portion of its life cycle in the husk of the immature nut and causes the husk to become mushy, turn black, and adhere to the shell upon drying. This mushy husk causes a bad staining of the shell and although the so-stained nuts may have wholesome kernels of good color they are ordinarily classed as culls and are utilized for "cracking" purposes or sold as "off grade". A third class of stain is that resulting from decay of the husk during harvesting, from reasons other than that of insect infestation, such as unfavorable weather conditions and the like. These stains do not readily respond to the hitherto proposed methods of bleaching. In addition to the above stains, indiscriminate stains of various types are caused by dirt and other débris with which the nut shells may come in contact, some of which stains are readily and others difficultly removed.

While the process of the present invention is useful in the treatment of badly stained nuts which have been culled out of a particular shipment, for example, the effectiveness of the process, taken with its low cost, makes it particularly useful in the treatment of entire shipments of nuts which may contain a comparatively small quantity of nuts which are so badly stained as to require rejection. The process of this invention serves to improve the color of all portions of the shells, whether discolored or not, and imparts to the bleached nuts a light, creamy straw color which is more preferable to the trade than the darker brownish straw color obtained by hitherto proposed bleaching procedures. Nut shells which have been bleached by the present process are of more pleasing appearance and are readily distinguishable from natural (unbleached) nut shells, and from nut shells bleached by any heretofore proposed process, and due to the improved appearance thereof may be considered to constitute a new article of commerce. Furthermore, the color makes the subsequent application of a "brand" mark easier and more effective.

According to the present process, nut shells, either as such or with the enclosed kernels or nut meats, in any condition of discoloration, i. e., nuts which exhibit a stain from any cause, are subjected to a pretreatment with an alkaline reagent in the presence of water, and, preferably while damp, are subjected to a bleaching treatment with an aqueous solution of hydrogen peroxide, and allowed to dry. This process may be combined with "tumbling" and/or scrubbing procedures to remove adhering dirt or the like, if desired, depending upon the practice at a particular packing house and the availability of such equipment. In its preferred embodiment the pretreatment step of the invention is one which will cause an active evolution of oxygen upon the subsequent contact with the hydrogen peroxide solution, and in its most preferred embodiment the process is one in which the pre-treatment is effected with an alkaline reagent which also exerts some bleaching effect on the nut shells, as well as contributing to the bleaching and subsequent liberation of oxygen during the hydrogen peroxide treatment.

According to the preferred practice of the invention, the shells are immersed in a dilute solution of sodium hypochlorite, NaOCl, (concentrations in the neighborhood of 2% being found satisfactory), the shells agitated to insure complete contact and to also loosen adhering dirt, after which the solution is drained from the shells. While the shells are still damp and preferably while the shells are still impregnated and/or coated with residual NaOCl solution, they are immersed in a solution of hydrogen peroxide, agitated for a sufficient period to secure thorough impregnation of the shells, after which the shells are withdrawn from the solution and allowed to dry.

For the most part I prefer that the concentration of hydrogen peroxide employed be such that the terminal concentration (i. e., the concentration of hydrogen peroxide in contact with the nuts when the nuts are withdrawn from the solution) be in the neighborhood of from 5 to 25 volumes, and more preferably from 10 to 15 volumes (the usual commercial strength of hydrogen peroxide solution is 3% $H_2O_2$ or "10 volumes", which means that the solution will liberate oxygen, under standard operating conditions, to the extent of 10 times the solution). The contact of the nuts with the hypochlorite and hydrogen peroxide solutions may be carried out in the conventional tumbling cylinders now in use in the walnut packing industry, for example, and the time of contact in the hypochlorite solution should be prolonged for a sufficient time to secure the full bleaching effect of that reagent. A treatment time of from three to five minutes is in general required. In this treatment sufficient time must be allowed for the alkaline reagent to soak into the substance of the nut shells. In the $H_2O_2$ contact a treatment time of from one to three minutes is satisfactory, it being merely necessary to thoroughly contact the shells which are soaked with the hypochlorite solution, and sufficient time is allowed to neutralize such solution and wet the shells thoroughly with the $H_2O_2$ solution. Longer immersion times do not significantly alter the degree of bleaching which is ultimately secured.

The hydrogen peroxide may be brought into contact with the pre-treated nuts at any desired concentration. For example, I may use concentrations of from 35 to 50 volumes at the start of the application but, as above brought out, the terminal concentration of the solution at the time the nuts are withdrawn from contact is preferably within the range of 5 to 25 volumes. Terminal concentrations greater than 25 volumes may in some instances produce an objectionable white appearance on some varieties of nuts. The concentration of $H_2O_2$ does not significantly affect the rate of bleaching, but does affect the extent to which the shell will be bleached. In contrast to the hypochlorite contact, the bleaching with $H_2O_2$ does not take place to any significant extent during the immersion of the shells in the reagent, but progresses throughout the time the shells are subsequently drying, as long as any $H_2O_2$ remains in the shell. Depending upon the temperature and humidity conditions to which the contacted nuts are subsequently subjected, this drying period may require from 24 to 48 hours or longer, although accelerated results may be obtained by passing the nuts through a warming oven, care being taken to prevent over-heating the nuts, which might develop rancidity in the kernels. The temperature obtaining in the treatment, both in the pretreatment and hydrogen peroxide treatment steps, is dictated primarily by the effect of temperature on the development of rancidity in the nut meats, a criterion which may be disregarded in the event the treatment is employed on shells alone. For the most part ordinary atmospheric temperatures, or temperatures reasonably adjacent thereto but not materially in excess of 100° F., are satisfactory for the treatment of whole nuts.

The pre-treatment with sodium hypochlorite is comparable to the conventional bleaching procedure now practiced in walnut packing houses, and results in a partial bleaching of the nuts. As above brought out, this bleaching step is ineffective to remove discolorations from "pink eye" nuts, and is only nominally effective in the removal of husk-fly stains and other stains heretofore mentioned. The subsequent treatment with hydrogen peroxide effects the removal of the "pink eye" discolorations, and completes the removal of husk-fly and other stains.

The subsequent treatment with hydrogen peroxide of shells which have been subjected to the hypochlorite treatment is also effective to eliminate the deleterious effect of the latter reagent on the flavor of the nut meats, which is particularly important where the shells have natural or artificial openings which will permit infiltration of the reagents into contact with the kernel. The subsequent contact of hydrogen peroxide solution with the residual hypochlorite in contact with the nut meat will for the most part vitiate the latter reagent in the production of oxygen and sodium chloride, the latter compound being unobjectionable when present in small amounts. For the most part, the available hydrogen peroxide for reaction with residual NaOCl will be greatly in excess of the amount stoichiometrically required for reaction, substantially irrespective of the relative concentrations employed, in that the quantity of residual NaOCl will be dependent upon the quantity of liquid remaining after the shells have drained following the pre-treatment step, while the available hydrogen peroxide will be present in great quantity due to the relatively large mass of solution which is employed for the immersion.

The alkalinity in the first or pre-treatment step, resulting from the presence of NaOH, for example, in the hypochlorite solution (it being understood that a commercial grade of hypochlorite solution, containing free caustic, is conveniently employed) serves as an activator for the decomposition of the subsequently employed $H_2O_2$, resulting in the more facile liberation of oxygen from that compound. Furthermore, where the pre-treatment reagent is a hypochlorite, some oxygen results from that compound upon the subsequent contact with the $H_2O_2$ solution, which is usually slightly acidified for the purpose of stability. In this connection, in view of the fact that commercial $H_2O_2$ is usually stabilized by the addition of a small amount of acid or some other reagent, I find it advantageous to add a small amount of an alkaline substance to the peroxide before contacting the nuts, to reduce the stability of the $H_2O_2$, wherefore it may more readily be decomposed when in contact with the shell substance. $NaOH$, $Na_2CO_3$, $NaHCO_3$, and $Na_2SiO_3$ are suitable for this purpose.

Alkaline reagents other than hypochlorites may be employed in the pre-treatment step, with somewhat variable results, but in each case an advantage is obtained in the $H_2O_2$ treatment where the alkaline pre-treatment is employed. Dilute solutions of sodium carbonate, sodium bicarbonate, or sodium hydroxide have been employed with good results. Other alkaline alkali metal or ammonia compounds may comparably be employed, as may any water-soluble non-toxic alkaline reagent which will react to assist the decomposition of $H_2O_2$ upon contact therewith. In connection with the use of sodium hydroxide, bicarbonate, or carbonate in the pre-treatment step, it has been found that the shells may be allowed to dry between the pre-treatment step and the subsequent hydrogen peroxide step without significant detriment to the bleaching action. Where a hypochlorite such as $NaOCl$ is used in the pre-treatment step it is of material advantage to effect the subsequent $H_2O_2$ contact before the shells have dried in order to realize the reactive character of the $NaOCl$. Where $NaOCl$-treated shells are allowed to dry and then subsequently treated with $H_2O_2$, the residual $NaOH$ resulting from the excess causticity of the $NaOCl$ solution functions to decompose the subsequently applied $H_2O_2$, in a manner comparable to the above-mentioned alkaline compounds; however, the combined bleaching result, while better than where a simple alkali is used in the pre-treatment step, owing probably to the inherent bleaching action of the $NaOCl$, is poorer than where the nuts are not allowed to dry and the subsequent treatment with $H_2O_2$ is consequently effected in the presence of undecomposed $NaOCl$.

Other water-soluble hypochlorites such as ammonium or potassium hypochlorite may be employed in place of the $NaOCl$, and hypobromite compositions are also useful, as will be apparent to one skilled in the art.

One of the particular characteristics of the present bleaching process is that of bleaching the shells throughout their thickness, a result which has not hitherto been obtained in the art. In the production of marketable whole nuts, the exterior appearance of the shell is practically the sole criterion of value, and the bleaching of the shells throughout their thickness contributes to the realization of a uniform color, due probably to the appreciable transparency of the shell, which allows subsurface discolorations to show through. Furthermore, this complete bleaching is of particular moment where the shells are to be crushed or ground in the production of a by-product, in view of the fact that the color of the resulting ground shell product is much lighter than if the bleaching had been confined to the surface of the shell.

According to the present process the shells may be bleached to as light a color as is desired, without detriment to the meat, which makes the process particularly useful in the treatment of pecans or the like where it is customary to first bleach the shells to an abnormal lightness and subsequently polish or dye the shells in order to make them sufficiently attractive to be marketable. Pecan shells, when bleached by the processes hitherto proposed, are dull and unattractive, and for this reason a subsequent polishing or dyeing operation is required. When pecans are bleached according to the present process, the resulting color of the shell is approximately the same color as that produced in walnuts, and the nuts are attractive without subsequent polishing or staining. Furthermore, the present bleaching process results in such uniform removal of discolorations and stains of various depths and intensities that the subsequent staining operation will produce a quite evenly toned product which has no appearance of artificiality.

A further advantage of the preferred form of the process, in which an alkaline hypochlorite is used in the pretreatment step, lies in the effective removal of residual surface contaminants, such as dirt, from the shells. This result is apparently obtained by the liberation of gaseous oxygen within the contaminating material upon contact with the $H_2O_2$, disintegrating and "blasting" such material from the shell surface.

In the preferred practice of this invention, where sodium hypochlorite is employed in the pre-treatment step, I prefer to use that grade of sodium hypochlorite which is at present employed in the bleaching of nuts, namely, one which has been "catalyzed" (as the term is employed in the bleaching trade) by the addition of small amounts of a metallic salt such as nickel sulphate, although some operators merely add a small amount of acid to ordinary hypochlorite solution to neutralize a portion of the excess alkali present. The addition of such a metallic salt or addition of acid has been observed to render the hypochlorite less stable, and to thus accelerate the bleaching effect thereof, and is for this reason employed in preference to the uncatalyzed variety of hypochlorite. In the present process, however, the use of the "catalyzer" is rendered less necessary than in the plain hypochlorite bleaching process, particularly in some varieties of nuts, due to the combined action of the hydrogen peroxide and the hypochlorite.

I claim:

1. The process of cleaning and bleaching nut shells, which comprises: subjecting such shells to contact with a dilute aqueous solution of a non-toxic alkaline reagent; subsequently subjecting such shells to contact with an aqueous solution of hydrogen peroxide, and causing the contacted shells to dry.

2. The process of cleaning and bleaching nut shells, which comprises: subjecting such shells to contact with a dilute aqueous solution of an alkaline alkali metal compound; subsequently subjecting such shells to contact with an aqueous solution of hydrogen peroxide in the presence of residual alkali metal compound resulting from the first-named contact, and causing the contacted shells to dry.

3. The process of cleaning and bleaching nut shells, which comprises: subjecting such shells to contact with a dilute aqueous solution of an alkaline alkali metal compound to secure an impregnation thereof; draining such shells to remove excess solution therefrom; subjecting the drained shells to contact with an aqueous solution of hydrogen peroxide to saturate the same therewith; draining such shells to remove excess hydrogen peroxide solution therefrom, and causing the shells to dry.

4. The process set forth in claim 3, in which the hydrogen peroxide solution is caused to be of a strength on the order of 5 to 25 volumes at the time said solution is drained from said shells.

5. The process set forth in claim 3, in which the hydrogen peroxide solution is caused to be of a strength on the order of 10 to 15 volumes at the time said solution is drained from said shells.

6. The process of cleaning and bleaching nut shells, which comprises: subjecting such shells to contact with a dilute solution of an alkali metal hypochlorite, subsequently subjecting such shells to contact with an aqueous solution of hydrogen peroxide, draining said peroxide solution from said shells, and causing said shells to dry.

7. The process set forth in claim 6, in which the peroxide contacting step is carried out while the shells are still wet from the hypochlorite contacting step.

8. The process set forth in claim 6, in which the hydrogen peroxide solution is caused to be of a strength on the order of 5 to 25 volumes at the time said solution is drained from said shells.

9. The process set forth in claim 6, in which the peroxide solution is caused to be of a strength on the order of 10 to 15 volumes at the time said solution is drained from said shells.

10. The process set forth in claim 6, in which the peroxide solution contacting step is carried out while the shells are still wet from the hydrochlorite contacting step, and in which the terminal concentration of the peroxide solution is on the order of 5 to 25 volumes.

JAMES A. ARMSTRONG.